United States Patent [19]
Tanabe et al.

[11] Patent Number: 5,811,012
[45] Date of Patent: Sep. 22, 1998

[54] DEIONIZED WATER OR HIGH PURITY WATER PRODUCING METHOD AND APPARATUS

[75] Inventors: Madoka Tanabe; Sakae Kaneko; Ikuo Shindo, all of Toda, Japan

[73] Assignee: Organo Corporation, Tokyo, Japan

[21] Appl. No.: 586,749

[22] PCT Filed: Jul. 21, 1995

[86] PCT No.: PCT/JP95/01460

§ 371 Date: Jan. 24, 1996

§ 102(e) Date: Jan. 24, 1996

[87] PCT Pub. No.: WO96/03350

PCT Pub. Date: Feb. 8, 1996

[30] Foreign Application Priority Data

Jul. 22, 1994 [JP] Japan .................................. 6-170549
Oct. 4, 1994 [JP] Japan .................................. 6-240232

[51] Int. Cl.$^6$ .................................................. C02F 9/00
[52] U.S. Cl. ...................... 210/669; 210/202; 210/257.2; 210/266; 210/269; 210/290; 210/900
[58] Field of Search ..................... 210/638, 663, 210/669, 670, 683, 685, 686, 266, 269, 283, 284, 290, 900, 902, 257.2, 259, 202

[56] References Cited

U.S. PATENT DOCUMENTS

| | | | |
|---|---|---|---|
| 2,813,838 | 11/1957 | Lyman et al. | 210/902 |
| 3,567,369 | 3/1971 | Chemtob | 210/683 |
| 3,870,033 | 3/1975 | Faylor et al. | 210/900 |
| 5,250,185 | 10/1993 | Tao et al. | 210/654 |

FOREIGN PATENT DOCUMENTS

| | | |
|---|---|---|
| 60-48150 | 3/1985 | Japan . |
| 4-90885 | 3/1992 | Japan . |
| 5-96279 | 4/1993 | Japan . |
| 2145709 | 4/1985 | United Kingdom . |
| 2249307 | 5/1992 | United Kingdom . |

*Primary Examiner*—Ivars Cintins
*Attorney, Agent, or Firm*—Fish & Richardson P.C.

[57] ABSTRACT

A deionized or high purity water producing method is describing wherein ions and non-ionic substances are removed. The method includes pretreating feed water to remove suspended non-ionic substances, containing the pretreated water with first and second ion exchange resins that include a boron selective ion exchange resin, and stratifying or mixing together the first and second resins within an ion exchange column. The boron selective ion exchange resin is included to remove boron ions contained in the pretreated water.

9 Claims, 16 Drawing Sheets

DEIONIZED WATER OR HIGH PURITY WATER PRODUCING METHOD AND APPARATUS

FIELD OF THE INVENTION

This invention relates to a method for producing deionized water or high purity water, and to an apparatus for producing the same. It also relates to a method and apparatus for producing deionized water or high purity water wherein the boron concentration is largely reduced. This water is used for example in electronics industries such as the semiconductor manufacturing industry, or related fields.

BACKGROUND OF THE INVENTION

This invention will be described as applied to the production of deionized water or high purity water, which is used in the electronics industry. In this field, in addition to the increasingly stringent requirements for the cleanliness of the production machinery, gases and reagents used in manufacturing processes, higher and higher purity water (and in some cases, hyperpurity water) is required as the circuitry density of microelectronics devices becomes high. In this way, the yields of these products are maintained and enhanced. In the future, such demand for water of higher purity will continue. Consequently, attempts are now being made to remove fine particulates, colloids and minute amounts of other impurities which had previously been ignored in earlier deionized water producing processes. Boron, for example, is generally present in well water and river water used as feed water in high purity water producing plants only to the extent of several tens of ppb. Since it is present in far lower levels than other impurities, it tended to be ignored, and was not included in the quality analysis items of water produced by these systems. However, with the advances made in water purification technology, it has become possible to reduce impurities to the level of ppt, but boron is now regarded as one of those impurities that are more difficult to remove using the conventional deionized water and high purity water producing systems.

This problem of boron will now be discussed with reference to the conventional high purity water purification system shown as an example in FIG. 17.

In FIG. 17, 1 is a pretreatment unit for removing suspended solids and some of the organic matter from feed water such for example as industrial water. Pretreated water, after passing through a filtered water tank 2, is sent to a two bed ion exchange deionization system (two-bed with a degasifier type) 3 comprising a cation exchange resin column (K column) 31, a decarbonating column 32 and an anion exchange resin column (A column) 33 where ionic impurities are removed. 4 is a demineralized water storage tank for storing treated water after removal of these ionic impurities.

5 is an RO (Reverse Osmosis) apparatus comprising a reverse osmosis membrane which removes impurities such as residual inorganic ions, organic matter and minute particles in the treated water from which most of the impurity ions have been removed by the two bed ion exchange deionized system 3. 6 is a tank for storing RO treated water.

7 is a vacuum degasifier which removes dissolved gases such as dissolved oxygen and carbon dioxide gas in the treated water from the RO apparatus 5. 8 is a regenerative type mixed bed ion exchanger which produces primary deionized water. This water is supplied to a primary deionized water tank 9.

10 is an ultra-violet oxidizer wherein primary deionized water from the tank 9 is irradiated by ultra-violet rays so as to cause oxidative decomposition of organic matter and to kill bacteria in the primary deionized water. 11 is a non-regenerative type mixed bed cartridge polisher which is designed to remove last traces of impurity ions from the deionized water which has already been refined to a high level.

From the effluent of this cartridge polisher 11, minute particles are removed by an ultrafiltration apparatus 12 comprising an ultrafiltration membrane, and the resulting high purity water is supplied to points of use 13 where it is used.

However, when the water quality of the high purity water produced by the above system was analyzed at points of use 13, it was found that the concentration of boron (B) was quite high when compared to that of other elements which had been reduced to under 10 ppt or less as can be seen from Table 1 which shows a typical analysis.

TABLE 1

| Elements | | Concentration |
|---|---|---|
| Lithium | (Li) | N.D. |
| Sodium | (Na) | N.D. |
| Beryllium | (Be) | N.D. |
| Magnesium | (Mg) | 0.1 ppt |
| Calcium | (Ca) | 0.7 ppt |
| Strontium | (Sr) | N.D. |
| Barium | (Ba) | N.D. |
| Titanium | (Ti) | N.D. |
| Zirconium | (Zr) | N.D. |
| Yanadium | (Y) | N.D. |
| Niobium | (Nb) | N.D. |
| Tantalum | (Ta) | N.D. |
| Chromium | (Cr) | N.D. |
| Molybdenum | (Mo) | N.D. |
| Manganese | (Mn) | N.D. |
| Iron | (Fe) | N.D. |
| Cobalt | (Co) | N.D. |
| Nickel | (Ni) | N.D. |
| Copper | (Cu) | N.D. |
| Silver | (Ag) | N.D. |
| Zinc | (Zn) | 0.2 ppt |
| Cadmium | (Cd) | N.D. |
| Boron | (B) | 20.0 ppt |
| Aluminum | (Al) | 0.6 ppt |
| Gallium | (Ga) | N.D. |
| Thallium | (Tl) | N.D. |
| Silicon | (Si) | 1.0 ppt |
| Germanium | (Ge) | N.D. |
| Tin | (Sn) | 0.2 ppt |
| Lead | (Pb) | N.D. |

N.D.: Not Detected

This leakage of boron (i.e., the fact that the boron concentration in the high purity water was not so low) was quite unexpected. In other words, in the aforesaid conventional high purity water producing system, the two bed ion exchange deionization system 3, RO apparatus 5, regenerative type mixed bed ion exchanger 8 and cartridge polisher 11 seems to contribute to removing boron, and it is therefore unexpected that boron cannot be sufficiently removed while going through the said conventional high purity water producing system. In order to make a more detailed study of this phenomenon of higher concentrations of boron in the high purity water, the inventors continuously monitored the boron concentration in the high purity water produced by the conventional high purity water producing system for 30 days at points of use 13 as shown in FIG. 17. It was found not only that boron was not sufficiently removed, but also that the boron concentration varied with time as shown in FIG. 16. Further, when the boron concentration was measured in the effluent of the two bed ion exchange deionization system on the condition that the ion exchangers were regenerated after every 5 days of fixed throughput endpoint operation (the exhaustion cycle was stopped to a 5-day fixed throughput endpoint before the leakage of silica or chloride ion started), it was found that whereas the electric conductivity of the treated water was maintained at a low level as shown in FIG. 15, boron leaked at a very early stage of the exhaustion cycle. Much the same phenomenon (boron ion leakage) was observed in the regenerative mixed bed ion exchanger and cartridge polisher which were located downstream of the two bed ion exchange deionization system.

This new observation conflicts with the conventional understanding held heretofore, according to which boron can be effectively eliminated by strongly basic anion exchange resins having high adsorption capacities provided that other anions are not present. Moreover, the reason why this observation had not been made in the past was evidently that, as stated hereinbefore, boron did not bring about any practical problem, hence almost no attention was paid to the existence of minute amounts of boron contained in deionized water produced by high purity water producing systems. As shown in FIG. 15, immediately after the regeneration of an anion exchange column packed with a strongly basic anion exchange resin the boron concentration is reduced to extremely low levels, and it may be conjectured that this is why the above-mentioned inventors' observations had not been made previously.

Even in the conventional method using a strongly basic cation exchange resin, boron is efficiently removed during a relatively short period immediately after the regeneration of the resin, and it is therefore possible to maintain the boron concentration at a low level by using a large amount of this type of resin (longer periods between regenerations) or by performing regeneration frequently. However these measures are not suitable for commercial application from the standpoint of economics.

If high purity water from which boron has not been completely removed is used for manufacturing semiconductor devices and the like, various adverse effects are brought about due to instability of the control of the boron concentration in the water. For example, when it is attempted to form an n channel transistor on a substrate, the threshold voltage of the transistor depends on the boron concentration in the substrate, so there is a possibility that the characteristics of the semiconductor device, which is the final product, will be seriously impaired. Also, with increasingly higher levels of circuit integration in recent years, a particular need has emerged to manufacture minute n channel MOS transistors. In this case, it is necessary to strictly control the boron concentration in the depth direction of the substrate from the viewpoint of preventing punch-throughs in the MOS transistors, but if the boron concentration of the water used is unstable, this kind of control is impossible.

Therefore, increasing importance is now being placed on adequately reducing boron concentration in the high purity water used for rinsing microelectronics devices, and the like.

DISCLOSURE OF THE INVENTION

In view of the aforesaid problems inherent to the conventional ion exchange deionization technology, this invention was conceived to provide a method and apparatus for producing deionized or high purity water having reduced boron concentrations.

It is another aim of this invention to provide a method and apparatus for producing deionized or high purity water wherein the boron concentration is constantly maintained at low levels without the need to increase the number of regeneration cycles of a regenerating ion exchanger, or the frequency of replacing the ion exchange resins in a non-regenerating ion exchanger.

It is a further aim of this invention to provide a method and apparatus for producing deionized or high purity water wherein the boron concentration is reduced to sufficiently low levels for the semiconductor manufacturing industry and related fields.

The features and advantages of the present invention whereby these aims and objects are attained, are enumerated in the claims which are appended hereto.

According to the first invention, in a method for producing deionized or high purity water comprising pretreatment to remove suspended solids, and downstream purification treatment to remove ionic and non-ionic substances from the pretreated water, the pretreated water is brought into contact with a boron selective ion exchange resin to remove boron at some stage of the downstream purification treatment.

The boron selective ion exchange resin used in the first invention may be any ion exchange resin that selectively removes boron, typical examples being AMBERLITE (trade name: Rohm and Haas Company) IRA-743T and DIAION CRB02 (Mitsubishi Kasei) containing polyhydric alcohol groups as functional groups. According to this invention, the use of these boron selective ion exchange resins is sine qua non. If conventional strongly basic anion exchange resins which were previously considered to have excellent boron adsorption capacities and high exchange capacities are used instead, large amounts of boron are unexpectedly leaked at an early stage as described hereinbefore, so the object of this invention cannot be achieved.

The term "pretreatment" referred to hereinabove may be any treatment that comprises coagulation/sedimentation, filtration, in-line coagulation/filtration, activated carbon adsorption, membrane turbidity removal, and so forth.

The term "purification treatment" referred to hereinabove may be any treatment that comprises ion exchange, reverse osmosis, electrical regeneration ion exchange, and so forth.

The phrase "pretreated water is brought into contact with a boron selective ion exchange resin" refers to the process wherein pretreated water is passed through an ion exchange column packed with a boron selective ion exchange resin, although other ion exchange resins may be mixed with or arranged in layers with this boron selective resin in the column.

The second invention relates to the deionized water or high purity water producing apparatus used to implement the aforesaid method. This apparatus comprises a pretreatment unit comprising turbidity removing means to remove suspended solids in the feed water, and purification treatment section comprising deionization and membrane separation means to remove ionic and non-ionic substances from the pretreated water, with an ion exchange column containing a boron selective ion exchange resin being installed as a boron ion removing means in at least one position in the water treatment system between the outlet of the pretreatment unit and the outlet of the purification treatment section.

The turbidity removing means in the pretreatment unit may be those for coagulation/sedimentation, filtration, in-line coagulation/filtration, activated carbon adsorption, membrane turbidity removal and so forth that perform the pretreatment of the first invention.

As deionizing and membrane separation means for removing ionic and non-ionic substances in the purification treatment section, the ion exchanger, electrical regeneration ion exchanger, reverse osmosis membrane and so forth which are the embodiments of the methods of the first invention may be used, but the purification treatment section comprising a primary deionized water production system for obtaining primary deionized water from water in the pretreatment unit equipped with a membrane separation means, a tank for storing this primary deionized water, and a secondary deionized water production system equipped with an ion exchange means, a membrane treatment means and so forth for obtaining high purity water from the primary deionized water in its tank, as defined in claim 3, is particularly to be preferred. The primary deionized water production system may comprise other means such as decarbonating and degassing units. Further, the second deionized water production system may comprise means such as an ultraviolet oxidation apparatus.

In the high purity water producing apparatus comprising the primary and secondary deionized water production systems, in general, high purity water is continually recirculated by returning excess high purity water to the primary deionized water tank via a high purity water recirculation pipe while high purity water is used at points of use, or even when it is not used. This recirculation line and the secondary deionized water production system forms a closed loop with the secondary deionized water production system consisting of, for example, an ultraviolet oxidation apparatus, a cartridge ion exchange polisher and an ultrafiltration membrane apparatus. The same recirculation arrangement is also adopted to advantage in the present invention, because if the operation of the high purity water production system is stopped while high purity water is not being used at points of use, the water stagnates in the pipes and treatment systems. This leads to proliferation of bacteria, release of ions and organic substances albeit in small amounts, and deterioration of the quality of high purity water. Furthermore, minute particles may be leaked from the materials used for the system due to shocks created at the time of stopping or re-starting the system.

In the primary deionized water production system too, a recirculation line may be formed such that even when the primary deionized water tank is full, operation of the upstream stage is not stopped, and it is often preferable to adopt this arrangement also with regard to the present invention. In this recirculation system, for example, when a low water level (level drop) is detected by a level switch attached to the primary deionized water tank, primary deionized water is added to the tank via an automatic change-over valve. Conversely, when a high water level (level rise) is detected in the tank, the automatic change-over valve is switched so that primary deionized water is returned to an RO treated water storage tank installed in, for example, the last stage of the RO apparatus via the primary deionized water recirculation pipe. This typically forms a closed loop, i.e. RO treated water tank—vacuum degasifier—regenerative type mixed bed ion exchanger—automatic change-over valve—primary deionized water recirculating pipe—RO treated water tank. This primary deionized water recirculation loop is provided for the same reasons as the aforesaid high purity water recirculation loop, i.e. to avoid water quality fluctuations when the system is started and stopped, and so forth.

The ion exchange column containing the boron selective ion exchange resin may be installed in the middle of the flowpath taken by the pretreated water flowing out of the pretreatment unit, between pieces of equipment in the purification treatment section, or in the deionized water or high purity water flowpath from the purification treatment section (actually, at a point preceding the last membrane treatment apparatus in the secondary deionized water production system). The ion exchange column may be packed with a boron selective ion exchange resin alone, with a mixture of another resin with the boron selective resin, or with another resin or resins and the boron selective resin arranged in layers. These columns may be provided at one, two or more positions, however it is often preferable to provide one as a regenerating type in any position between the anion (A) column of the two bed ion exchange deionization system and the regenerating type mixed bed ion exchanger in the primary deionized water production system, or as a non-regenerating type in the deionized water flowpath from the primary to the secondary deionized water production system. Further, in addition to providing an ion exchange column containing a boron selective ion exchange resin in the main flowpath of the deionized water or high purity water production system, a column may be provided also in the middle of the recirculation line (e.g. the line that returns high purity water to the primary deionized water tank).

The ion exchange column containing the boron selective resin may contain this resin alone, or mixed with another resin, e.g. a strongly acidic cation resin or strongly basic anion resin, alternatively these resins may be arranged in layers. In this context, the term "layers" refers to the situation where two or more resins are packed in one column, the two or more resins being used not as a mixture but as layers when water is passed through them. Typically, a cation exchange resin may be arranged downstream of the boron selective ion exchange resin in one column, or an anion exchange resin may be arranged upstream of the boron selective ion exchange resin in one column. In these cases, the boron selective ion exchange resin can be regenerated by using a regenerating means that passes an acidic aqueous solution through a column containing a layer of a cation exchange resin, and a regenerating means that passes an alkaline aqueous solution through a column containing a layer of an anion exchange resin. The boron selective ion exchange resin can be regenerated by either acid or alkali.

The term "mixed" refers to the situation where two or more resins are packed in one column, the two or more resins being used in admixture with one another. A typical example is a regenerative type mixed bed ion exchanger wherein a boron selective ion exchange resin, cation exchange resin and anion exchange resin are mixed together. In this mixed bed ion exchanger, if a boron selective resin having a lower specific gravity than the anion exchange resin is used, a separation can be made in the order of, from the bottom, cationic resin—anionic resin—boron selective resin, so an ordinary regeneration arrangement for the mixed bed ion exchanger can be employed using both an acidic aqueous solution and an alkaline aqueous solution as regenerating agents.

A typical example of acid regenerant is an aqueous solution of sulfuric acid or hydrochloric acid of a predetermined concentration, and an example of an alkali regenerant is an aqueous solution of sodium hydroxide of a predetermined concentration.

The ion exchange column containing a boron selective ion exchange resin may also be a non-regenerative type, in which case it is often preferable to install it downstream of the primary deionized water production system in the deionized water or high purity water treatment apparatus comprising the aforesaid primary—secondary systems.

In view of the leakage of organic matter from these resins, at least one, and preferably both of, an ultraviolet oxidation apparatus and a reverse osmosis membrane apparatus may be installed downstream of the ion exchange column containing the boron selective ion exchange resin.

As devices and equipment such as ion exchangers and membrane separators that comprise the deionized water or high purity water producing apparatus of this invention, those known in the art may be used without modification, and the basic system of a conventional deionized water or high purity water production apparatus may also be applied to this invention without modification.

In this deionized water or high purity water producing apparatus provided with an ion exchange column containing a boron selective ion exchange resin, either a fixed throughput endpoint operation or an operation wherein the leakage of boron is monitored may be adopted for both the regenerating and non-regenerating types of boron selective resin column. If the leakage of boron is monitored, the boron meter may be an instrument wherein a boron derivative is generated using a chronotropic acid, and the intensity of fluorescence of this derivative is measured by a fluorescence photometer, or alternatively, the measurement may be performed by an ICP-MS analyzer that measures boron directly with high sensitivity. These boron meters may be installed "in-line" at the place of measurement, or alternatively these may be installed externally from the deionized water or high purity water producing apparatus and the boron concentration measured externally. The boron monitoring may be done by measuring and observing the boron concentration in the effluent of the ion exchange column containing a boron selective ion exchange resin, and replacing the resin or regenerating it when the boron concentration reaches a predetermined value. This predetermined value may be determined according to the purpose of using deionized or high purity water, taking into account the allowable upper limit of boron concentration in the deionized water or high purity water.

A plurality of these ion exchange columns containing a boron selective ion exchange resin may be connected in series, the first column being regenerated and transferred to the last stage when the resin in the first column has reached a fixed throughput (or when the boron concentration in the treated water from the first column has reached the predetermined value). Alternatively, a merry-go-around system can be adopted. In this system, the first column is removed and a new column, which has new or regenerated resin, is connected to the last column. Such a system may be easily operated by switching pipes and valves.

The deionized water and high purity water produced by the method and apparatus of this invention may be used without limitation where highly purified water containing low levels of boron is required, and is used to advantage in the semiconductor field mentioned hereinabove.

In the fields to which this invention may be applied, and particularly in the semiconductor manufacturing industry and related fields, the continuous operation of the apparatus, to ensure a stable supply of water, is important from the viewpoint of improving product yields and productivity. In this context, the frequency of regeneration or replacement of ion exchangers that are component parts of deionized water and high purity water producing apparatus, is a matter that cannot be ignored, and according to the present invention, this frequency can be drastically reduced.

According to this invention, by bringing pretreated water containing boron into contact with a boron selective ion exchange resin, i.e. an anion exchange resin into which polyhydric alcohol has been introduced as functional groups, boron can be selectively and definitively eliminated. This is the first time that it has been possible to produce deionized or high purity water, wherein boron has been reduced to extremely minute amounts, on an industrial scale.

As described hereintofore, therefore, one advantage of this invention, as outlined in the claims appended hereto, is that deionized water or high purity water, wherein the boron concentration has been adequately suppressed, can now be produced.

Another advantage of this invention is that it provides a method and apparatus for producing deionized water or high purity water wherein the boron concentration is constantly maintained at low levels without increasing the number of regeneration cycles of regenerating type ion exchangers or the frequency of replacement of non-regenerating type ion exchangers.

Yet another advantage of this invention is that deionized water or high purity water, wherein the boron concentration has been adequately suppressed, can now be supplied for use in the semiconductor industry or related fields.

These advantages and effects will become apparent from the various embodiments described hereinafter.

DESCRIPTION OF SYMBOLS

Figure 1:
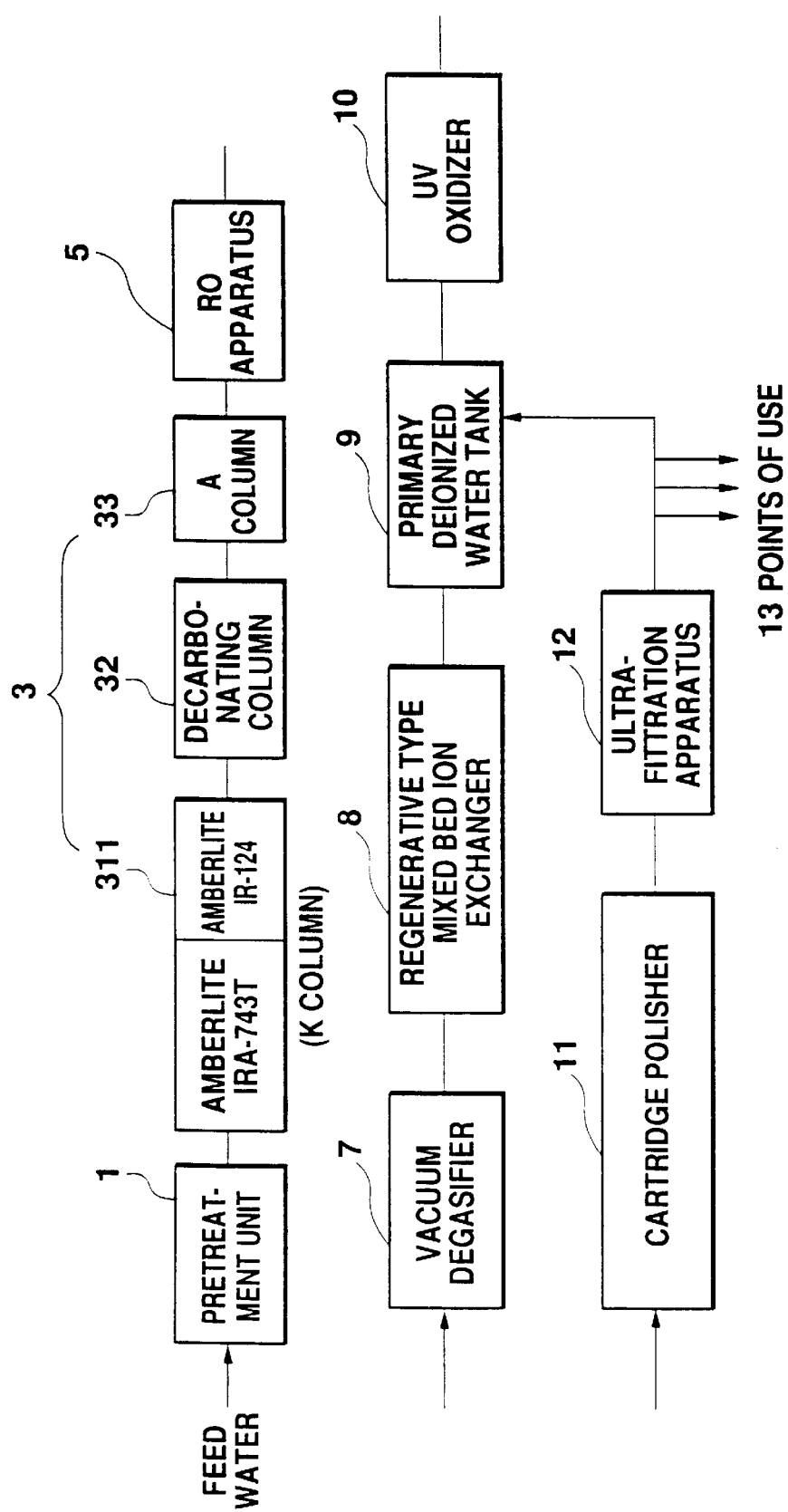
FIG. 1 is a block diagram showing the essential features of the construction of a high purity water producing apparatus according to Example 1 of this invention.

1 Pretreatment unit
3 Two bed ion exchange deionization system
31 K column
311 K column
32 Decarbonating column
33 A column
331 A column
5 RO apparatus
7 Vacuum degasifier
8 Regenerative type mixed bed ion exchanger
9 Primary deionized water tank
10 UV oxidizer
11 Cartridge polisher
12 Ultrafiltration apparatus
13 Points of use
300 Ion exchange column
400 Ion exchange column
500 Ion exchange column
800 Regenerative type mixed bed ion exchanger
Preferred Embodiments of the Invention (Examples)

This invention will now be described in further detail with reference to specific examples.

EXAMPLE 1

FIG. 1 is a block diagram showing the essential features of the construction of a high purity water producing apparatus according to Example 1 of this invention. In the figure, 1 is a pretreatment unit for removing some of the suspended solids and organic matter in feed water such as industrial water. The water from this pretreatment is passed through a filtered water tank, (not shown), and is sent to a two bed ion exchange deionization system 3 forming a deionizer where it passes successively through a cation exchange column (K column) 311, decarbonating column 32 and anion exchange resin column (A column) 33 in order to remove ionic impurities.

It is an essential feature of this example that the cation exchange column (K column) 311 of the aforesaid two bed ion exchange deionization system 3, comprises an upstream layer (upper part of column) of AMBERLITE IRA-743T (Rohm and Haas Company), which is a boron selective ion exchange resin, and a downstream layer (lower part of column) of AMBERLITE IR-124 (Rohm and Haas Company), which is a strongly acidic cation exchange resin. The features and functions of this high purity water producing apparatus will now be described.

5 is an RO apparatus comprising a reverse osmosis membrane for removing impurities such as inorganic ions, organic matter and fine particles in the treated water from which a major portion of impurity ions has already been removed by the aforesaid two bed ion exchange deionization system 3.

7 is a vacuum degasifier that removes dissolved gases such as oxygen and carbon dioxide in the treated water from the RO apparatus 5. 8 is a regenerative type mixed bed ion exchanger. Through these apparatuses, primary deionized water is produced which is then supplied to and stored in a primary deionized water tank 9.

10 is an ultraviolet oxidizer that irradiates the primary deionized water from the tank 9 with ultraviolet rays, oxidatively decomposes organic matter in this deionized water, and kills bacteria. 11 is a cartridge polisher which is a non-regenerating type mixed bed ion exchanger that further removes impurity ions from the deionized water which has little if any ionic load.

From the effluent of this cartridge polisher 11, fine particles are removed by an ultrafiltration apparatus 12 comprising an ultrafiltration membrane so as to produce high purity water which is then supplied to points of use.

Figure 17:
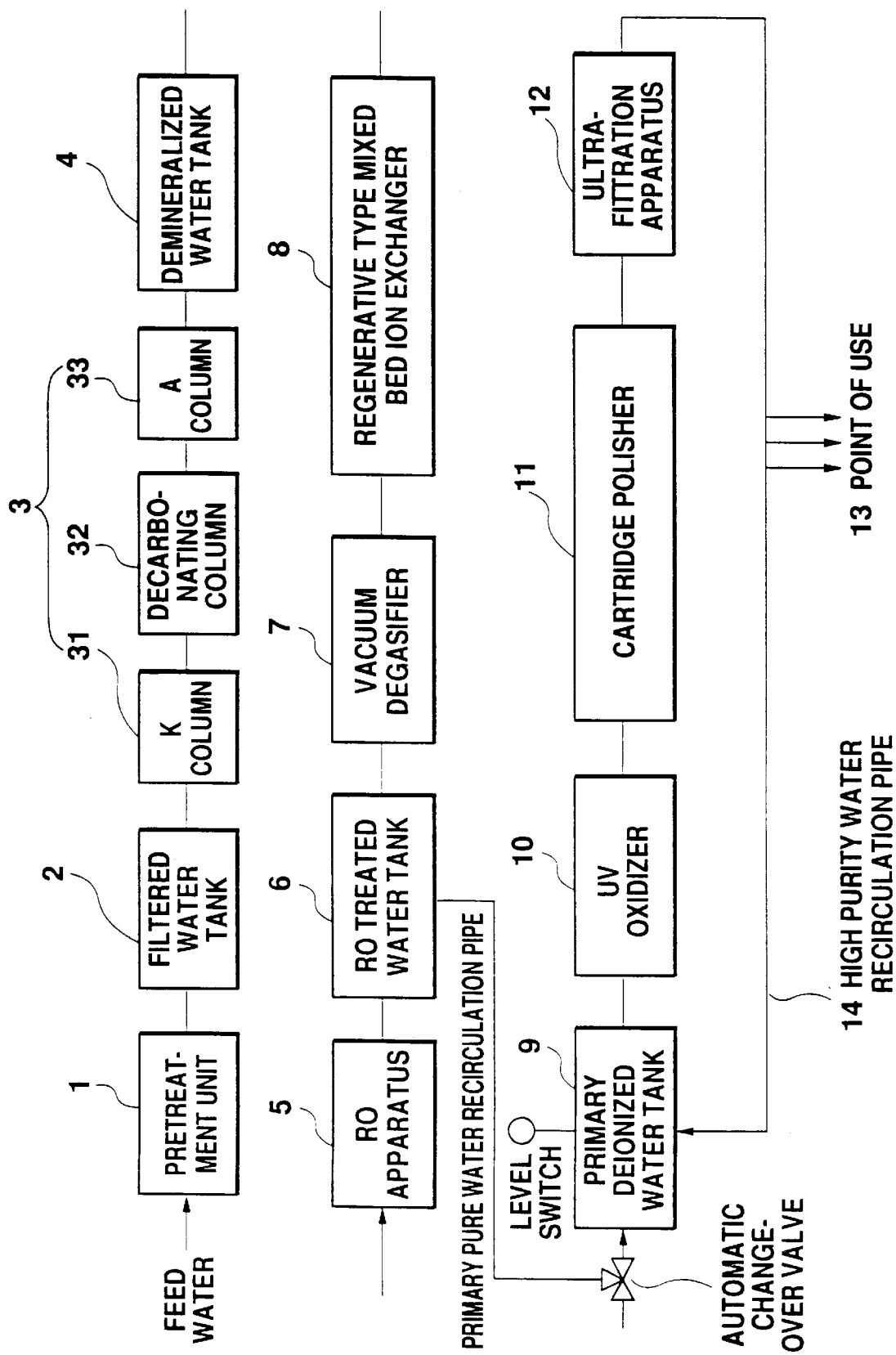
FIG. 17 is a block diagram showing the essential features of one example of a conventional high purity water producing apparatus.

Apart from the cation exchange resin column 311 (K column) of the two bed ion exchange deionization system 3, the high purity water producing apparatus having the aforesaid features has much the same basic construction as the conventional high purity water producing apparatus shown in FIG. 17.

It is another essential feature of this example that, in the aforesaid cation exchange resin column 311 (K column), AMBERLITE IRA-743T, which is a boron selective ion exchange resin having N-methyl-glucamine as functional groups, and AMBERLITE IR-124, are packed in layers in the column with the former resin situated above the latter resin (in this example, the volume ratio of the two resins is Amberlite IRA-743T/Amberlite IR-124 2.5/4.0). The reason for situating the boron selective resin upstream in the column is that effluent from a cation exchange resin is generally acidic with a pH of 2 or less, and if Amberlite IRA-743T were located downstream of Amberlite IR-124, the boron adsorption performance of IRA-743T would not be fully utilized. The K column may alternatively consists of a separate column packed with AMBERLITE IR-124 alone, preceded by a column packed with Amberlite IRA-743T.

Due to the aforesaid system scheme, boron can be selectively removed by the boron selective ion exchange resin (Amberlite IRA-743T) from pretreated water containing large amounts of other coexisting ions. The remaining coexisting ions are basically removed by the deionization function of the aforesaid two bed ion exchange deionization system 3 having a conventional structure. In the high purity water producing apparatus of this example, therefore, as boron in the pretreated water is selectively removed by the boron selective resin (Amberlite IRA-743T), passage of boron to the downstream two bed ion exchange system 3 is reduced, and leakage of boron is prevented over a long period of time without shortening the regeneration cycle time of the two bed ion exchange deionization system 3.

Figure 2:
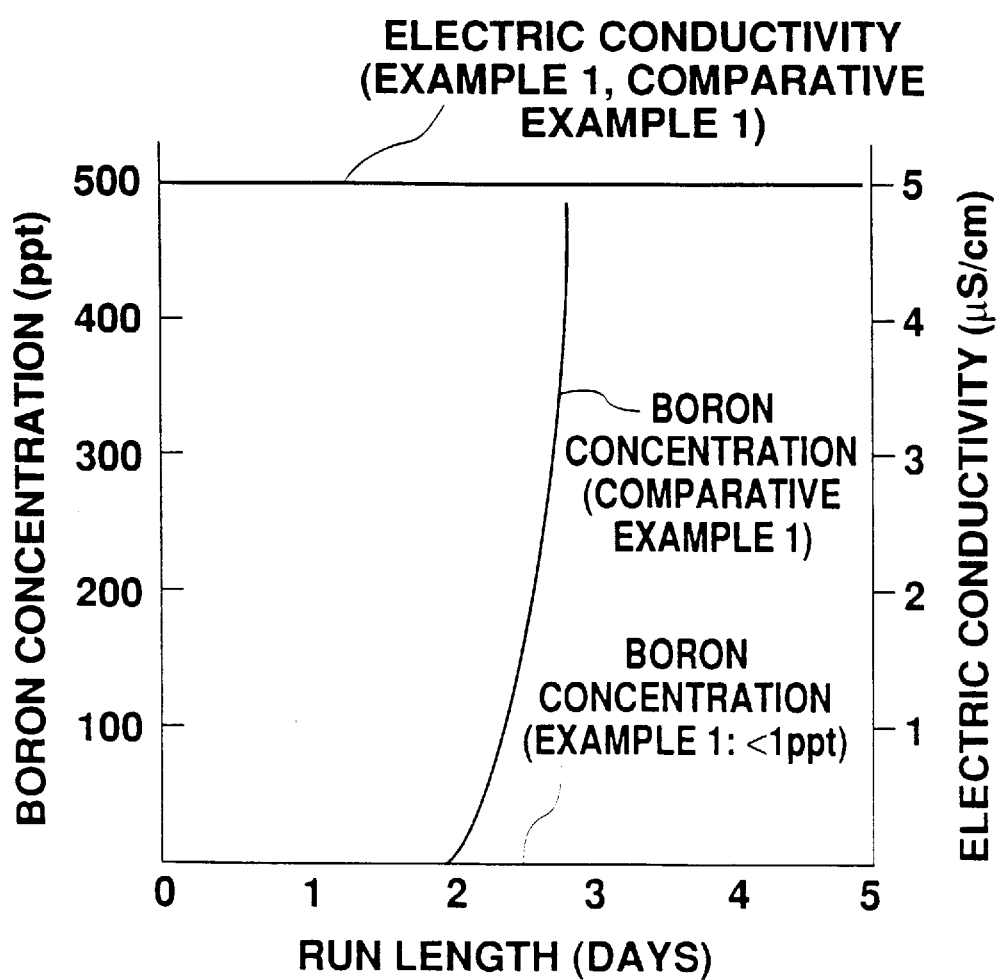
FIG. 2 is a diagram showing the variation of boron concentration in the effluent of a two bed ion exchange system according to Example 1 and Comparative Example 1.

Using the aforesaid apparatus scheme, high purity water was produced under the following conditions, and the boron concentration of the effluent from the two bed ion exchange deionization system 3 was measured by an ICP-MS analyzer. The results are shown in FIG. 2.

[Conditions]

Apparatus (K column) Volumes of resins charged

| | |
|---|---|
| Amberlite IRA-743T | 2500 liters |
| Amberlite IR-124 | 4000 liters |

(Decarbonating column)

Tellarete packing type, diameter 0.6 m, height 2800 mm, Volume of air sent through the column 400Nm³/hr. (A column) Volume of resin charged

| | |
|---|---|
| Amberlite IRA-400 | 6000 liters |

Feed water
Industrial water

| | |
|---|---|
| Boron concentration | 40 ppb |
| Feed Water flowrate | 20 m³/H |
| Operating time | 5 days |

Regeneration of the K column 311 in this apparatus was performed as follows. The K column 311 was first backwashed to separate Amberlite IRA-743T to the top and Amberlite IR-124 to the bottom of the column due to the difference in specific gravities of these two resins. A volume of 4% hydrochloric acid equal to 2.5 times the volume of Amberlite IR-124 was passed upflow through the layers of Amberlite IR-124 and Amberlite IRA-743T. Then the column was washed with deionized water for 20 min. The amount (regeneration level) of hydrochloric acid used is the same as when the column is not charged with Amberlite IRA-743T. After regeneration, IR-124 is present in the hydrogen ion form and IRA-743T is present in its hydrochloric acid form in the K column 311.

Another feature of this example is the regeneration of the boron selective ion exchange resin Amberlite IRA-743T by an acid aqueous solution. The boron selective resin is generally present in its hydroxyl form, therefore in the regenerating method commonly employed, after adsorbed boron has been eluted with an acid solution, the resin is restored to its hydroxyl ion form with an aqueous solution of an alkali such as sodium hydroxide. After passing a hydrochloric acid solution through the column, therefore, regeneration is performed by passing an alkaline aqueous solution through Amberlite IRA-743T.

However, the inventors observed that boron adsorption performance of the resin could be restored to a certain level by regenerating it with only an acid aqueous solution. As the boron concentration of industrial or other water used for the production of deionized or high purity water that is the aim of this invention is no more than in the order of several 10–100 ppb, the regeneration with an acidic aqueous solution alone permits restoring the boron adsorption capacity of the resin to such an extent that is quite adequate for practical purposes. In the present example, therefore, an extremely simple regeneration was achieved by passing the acidic aqueous solution used for regenerating Amberlite IR-124 through Amberlite IR-743T.

Further, there are other advantages in that, when regeneration is performed only with the acidic aqueous solution, deterioration of resins is palliated compared to the case where the regeneration is performed with sodium hydroxide, and the TOC leakage is also reduced. Accumulation, in the form of hydroxides in the resin layers, of hardness components present in the feed water when the exhaustion cycle is resumed after regeneration, is thereby also prevented.

Comparative Example 1

High purity water was produced using the same apparatus and conditions as those of Example 1, excepting that instead of the K column 311 of the two bed ion exchange system 3 of Example 1, an ion exchange column packed only with AMBERLITE IR-124 was used. The boron concentration of the effluent of the ion exchange deionization system 3 was measured by an ICP-MS analyzer, and the results are shown in FIG. 2 together with the results obtained from Example 1.

As can be seen from the results of FIG. 2, whereas boron was definitely removed and the boron concentration of the effluent is constantly maintained at a low level in Example 1, a considerable leakage of boron occurred in a relatively short time after the start of the exhaustion cycle in Comparative Example 1.

EXAMPLE 2

Figure 3:
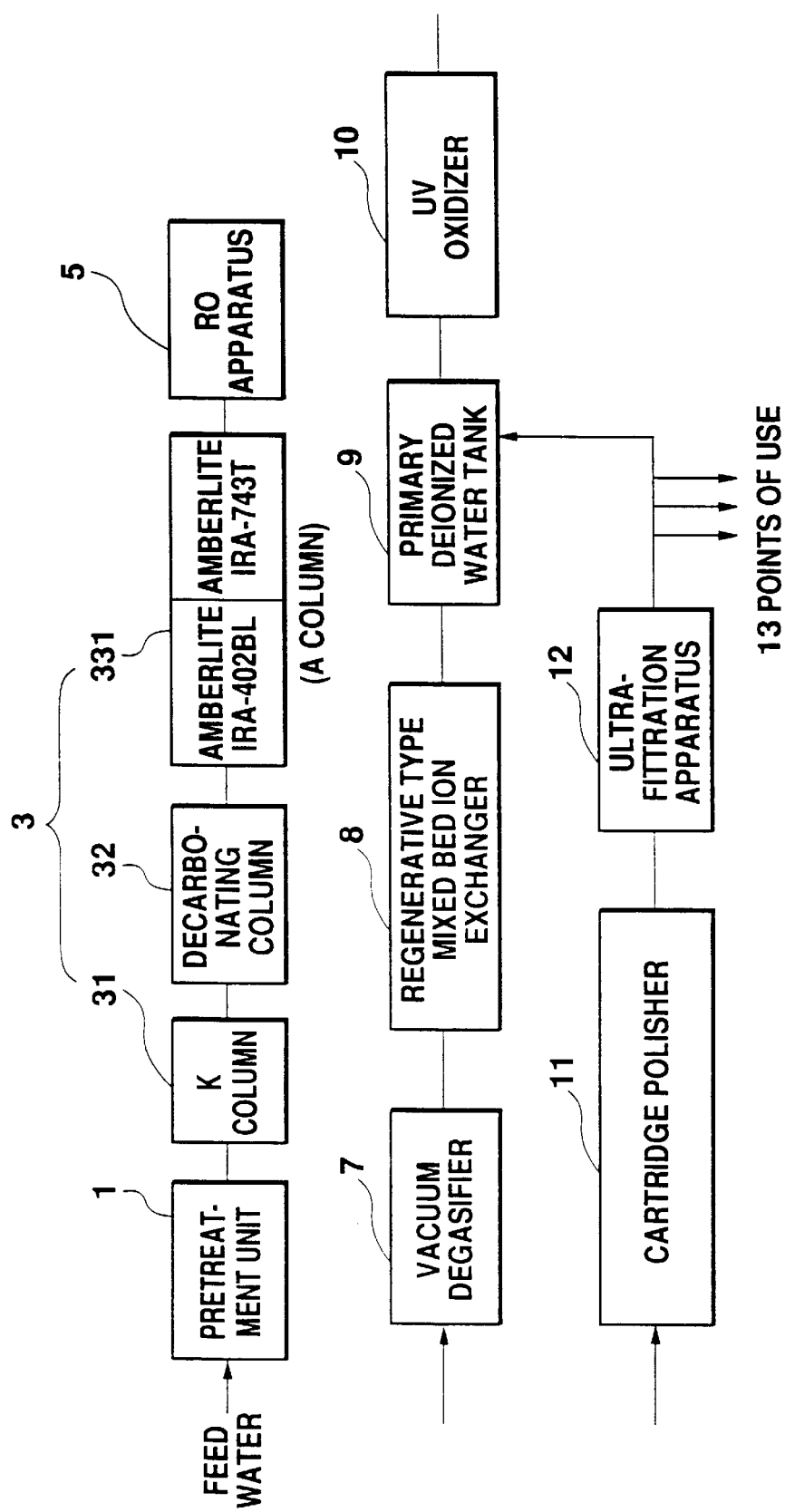
FIG. 3 is a block diagram showing the essential features of the construction of a high purity water producing apparatus according to Example 2 of this invention.

In this example shown in FIG. 3, the K column of the two bed ion exchange deionization system 3 of Example 1 was replaced with a K column 31 packed only with AMBERLITE IR-124. The A column 331 was packed with a layer of AMBERLITE IRA-743T, the aforesaid boron selective ion exchange resin, situated downstream (upper part of column) and a layer of AMBERLITE IRA-402BL situated upstream (lower part of column) (in this example, the volume ratio Amberlite IRA-743T/Amberlite IRA-402BL was 1/4). In the A column 331, influent water is passed upflow. The reason why the boron selective resin is situated downstream in the column is that the water upstream of the AMBERLITE IRA-402BL is acidic soft water and its pH is generally 2 or less. Although the boron adsorption capacity of AMBERLITE IRA-743T cannot be fully utilized under these conditions, the water treated by Amberlite IRA-402BL is neutral or slightly alkaline, so the boron adsorption capacity can then be fully exploited. The remaining system features of Example 2 are the same as those of Example 1.

High purity water was produced using the apparatus having the scheme shown in FIG. 3 and under the same conditions as those of Example 1, except that the K column 31 and the A column 331 were charged with the resins as described below. The boron concentration of the effluent of the two bed ion exchange deionization system 3 was measured using a ICP-MS analyzer. The results for boron concentration were the same as those of Example 1 shown in FIG. 2.

[Modification of Conditions]

(K column) Volume of resin charged

| | |
|---|---|
| Amberlite IR-124 | 4000 liters |

(A column) Volume of resin charged

| | |
|---|---|
| Amberlite IRA-402BL | 6000 liters |
| Amberlite IRA-743T | 1500 liters |

Regeneration of the resins charged in the A column 331 was effected by passing an alkaline aqueous solution through Amberlite IRA-402BL and Amberlite IRA-743T. Since an alkaline aqueous solution was used as the regenerant, the original ion exchange capacity of the boron selective resin (Amberlite IRA-743T) was restored, hence the quantity of the ion exchange resin required was reduced compared to the case of Example 1.

EXAMPLE 3

Figure 4:
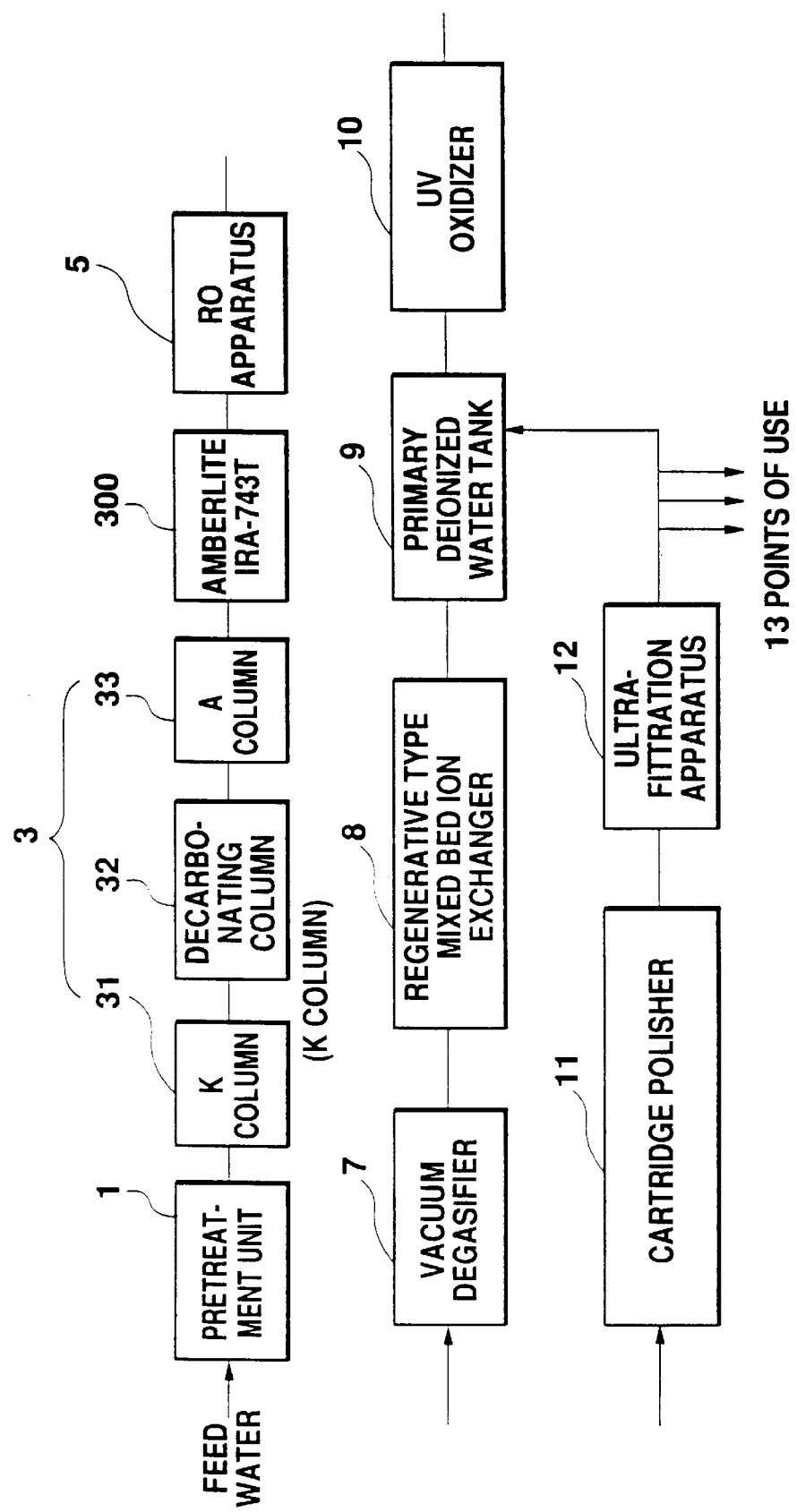
FIG. 4 is a block diagram showing the essential features of a high purity water producing apparatus according to Example 3 of this invention.

In this example shown in FIG. 4, the apparatus has much the same basic treatment scheme as the conventional high purity water producing apparatus shown in FIG. 17 (where the K column 311 of FIG. 1 has been replaced by the K column 31 packed only with an ordinary cation exchange resin), and an ion exchange column 300 packed only with AMBERLITE IRA-743T is provided between the A column 33 of the two bed ion exchange deionization system 3 and the RO apparatus 5. This is equivalent to the case where the A column 331 of Example 2 is a separate column packed with AMBERLITE IRA-402BL, and another ion exchange column packed with AMBERLITE IRA-743T is installed downstream.

Hence it was verified that if the conditions are the same, boron can be reduced to the same level as that of Example 2. That is to say, in Example 3 the boron concentration of the effluent of the ion exchange column 300 was the same as that of Example 2 when the exhaustion cycle was carried out under the same conditions.

Due to the fact that the ion exchange column 300 packed with Amberlite IRA-743T is a separate column from the A column 331 in Example 2, it is easy to provide an independent regeneration means for the ion exchange column 300. More specifically, the boron selective ion exchange resin can be regenerated to its ideal state (higher boron adsorption capacity) by passing the acidic aqueous solution for regenerating the K column through this column 300 before or after passing it through the K column so as to rapidly elute boron, and then passing the alkaline aqueous solution for the A column 33 through the column 300.

Further, as the column 300 packed with the boron selective resin Amberlite IRA-743T is provided separately from the A column 331 as used Example 2, an existing high purity water producing apparatus may be used without need of modification, and as the aim of this invention can be achieved simply by installing the column 300 after the A column 33, this invention is suitable for upgrading (retrofitling) existing apparatus. This advantage is the same as that of the separate column arrangement described in Example 1.

EXAMPLE 4

Figure 5:
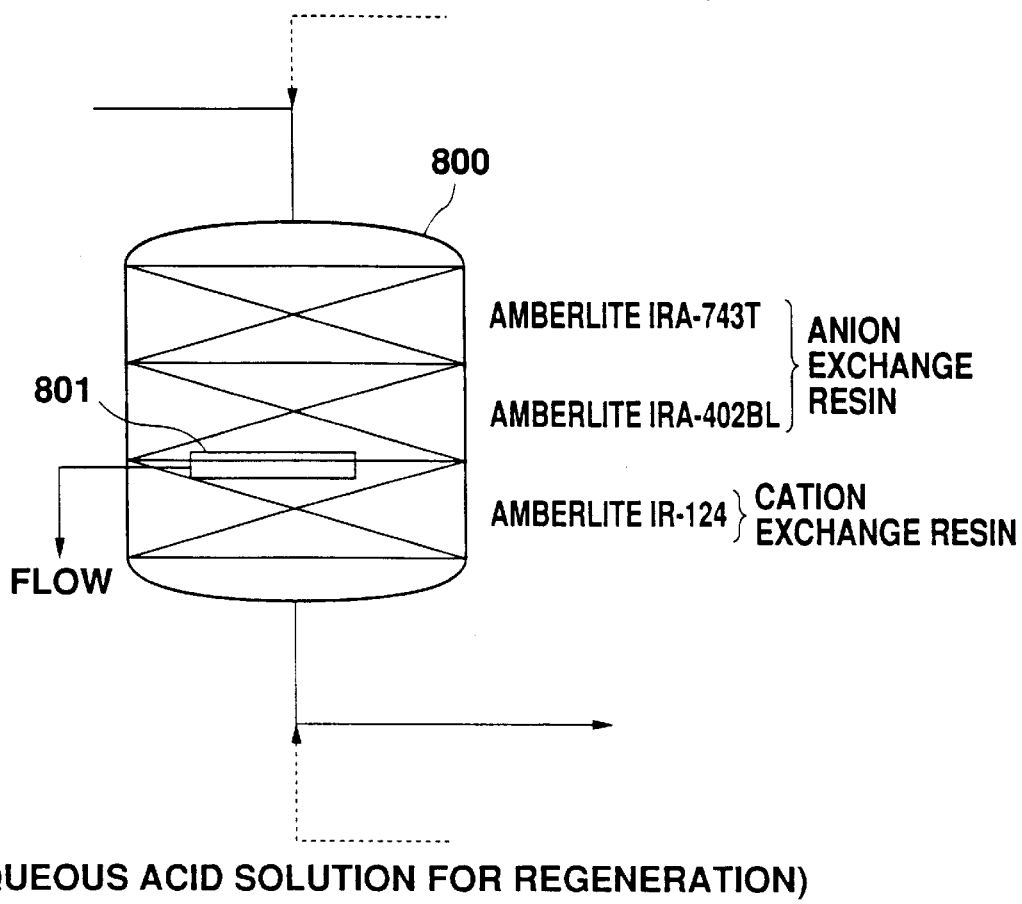
FIG. 5 is a block diagram showing the essential features of a high purity water producing apparatus according to Example 4 of this invention.

FIG. 5 shows a part of a high purity water producing apparatus. In this example, the K column 311 of Example 1 is replaced by a K column 31 charged only with a cation exchange resin. Further, the mixed bed ion exchange apparatus (MB column) 8 packed with an anion exchange resin and a cation exchange resin in the conventional high purity water producing apparatus, is replaced by a regenerative type mixed bed ion exchange apparatus 800 wherein a boron selective ion exchange resin is mixed with the anion exchange resin and cation exchange resin.

Apart from the admixture of 3 resins, the basic construction of the regenerative type mixed bed ion exchanger 800 is the same as that of the conventional regenerative type mixed bed ion exchanger 8. Backwashing 3 resins in the mixed bed ion exchanger 800 leads to 3 layered (stratified) beds of the boron selective resin Amberlite IRA-402BL, the strongly basic anion exchange resin Amberlite IRA-402BL and the strongly acidic cation exchange resin in that order from the upper to the lower portion of the column due to the difference in the specific gravities of these resins. After the backwash, the three resins are regenerated by passing an alkaline aqueous solution from the top of the column and an acidic aqueous solution from the bottom of the column. That is to say, the ordinary regeneration means for the conventional mixed bed ion exchanger may be used without modification, with a collector 801 being installed at the interface between the strongly basic anion exchange resin and the strongly acidic cation exchange resin.

Using a high purity water producing apparatus provided with the regenerative type mixed bed ion exchanger 800 shown in FIG. 5, high purity water was produced under the same conditions as those of Example 1 except for the ion exchange resins as described below (the K column 311 of the two bed ion exchange system 3 was packed only with AMBERLITE IR-124), and the boron concentration of the effluent of the exchanger 800 was measured by an ICP-MS analyzer. The results for boron concentration were the same as those of Example 1 shown in FIG. 2.

[Modified Conditions]

Resins charged in the mixed bed ion exchanger

| | |
|---|---|
| Amberlite IRA-743T | 800 liters |
| Amberlite IRA-402BL | 600 liters |
| Amberlite IR-124 | 300 liters |

The following results were obtained using the apparatus of this example.

As a strongly basic anion exchange resin was used in admixture with a strongly acidic cation exchange resin, ion exchange was effected under the near neutral conditions which permitted the maximum utilization of the capacity of the boron selective resin, this in turn resulted in minimizing the quantity of the boron selective resin.

Manufacture of the ion exchange columns and regeneration means are easy.

By adding a boron selective ion exchange resin to an existing regenerative type mixed bed ion exchanger, or by making simple modifications of an existing regeneration means as necessary, an existing apparatus may be converted to a deionized or high purity water producing apparatus with a function for removing boron.

EXAMPLE 5

Figure 6:
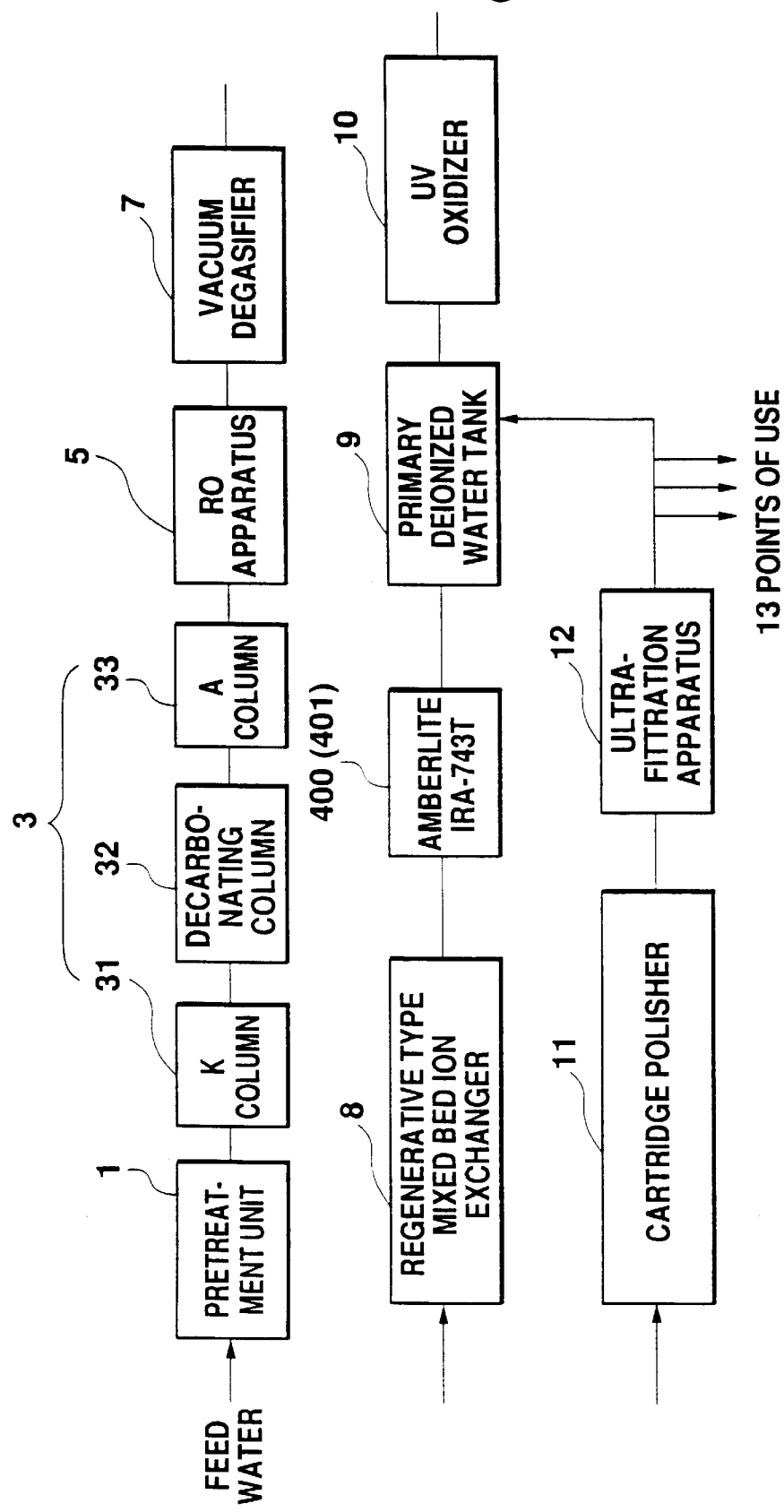
FIG. 6 is a block diagram showing the essential features of a high purity water producing apparatus according to Example 5 of this invention.

The example shown in FIG. 6 has the same basic treatment scheme as the conventional high purity water producing apparatus shown in FIG. 17 (where the K column 311 of FIG. 1 is replaced by the K column 31 packed only with an ordinary cation exchange resin), and a non-regenerating ion exchange column 400 packed only with AMBERLITE IRA-743T, which is a boron selective ion exchange resin, is provided between the regenerative type mixed bed ion exchanger 8 and the primary deionized water tank 9. The remaining features of the construction are the same as those of the conventional high purity water producing apparatus.

Figure 7:
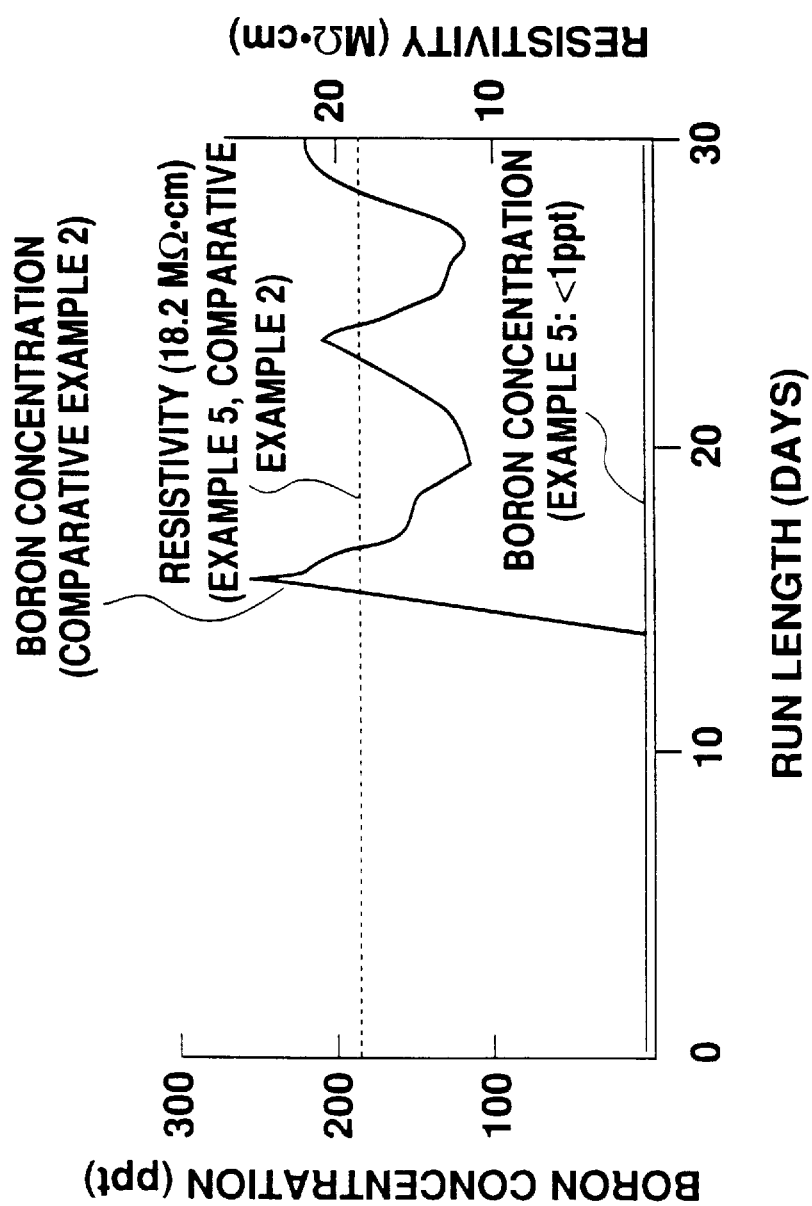
FIG. 7 is a diagram showing the variation of boron concentration in the effluent of an ion exchange column according to Embodiment 5 and Comparative Example 2.

Apart from the modifications mentioned hereinabove, high purity water was produced continuously for 30 days under the same conditions as those of Example 1, and the boron concentration of the effluent leaving the ion exchange column 400 was measured by an ICP-MS analyzer. The results are shown in FIG. 7.

As can be seen from the results, the boron concentration of the effluent from the column 400 was much the same as that in Example 1 for which the test results are shown in FIG. 2.

[Comparative Example 2]

For purposes of comparison, the non-regenerating ion exchange column 400 packed with AMBERLITE IRA-743T of Example 5 was replaced by a non-regenerating ion exchange column 401 packed with AMBERLITE IRA-402BL, and high purity water was produced under the same conditions as those of Example 5. The boron concentration of the effluent from the column 401 was measured by an ICP-MS analyzer. The results are shown in FIG. 7. In this case, the boron concentration fluctuated, and considerable leakage of boron occurred in 13 days after the start of the exhaustion cycle.

As can be seen from a comparison of Example 5 and Comparative Example 2, boron was effectively removed by the apparatus of Example 5, and thanks to the use of a non-regenerating ion exchange column, there is no variation of water quality due to regeneration.

EXAMPLE 6

Figure 8:
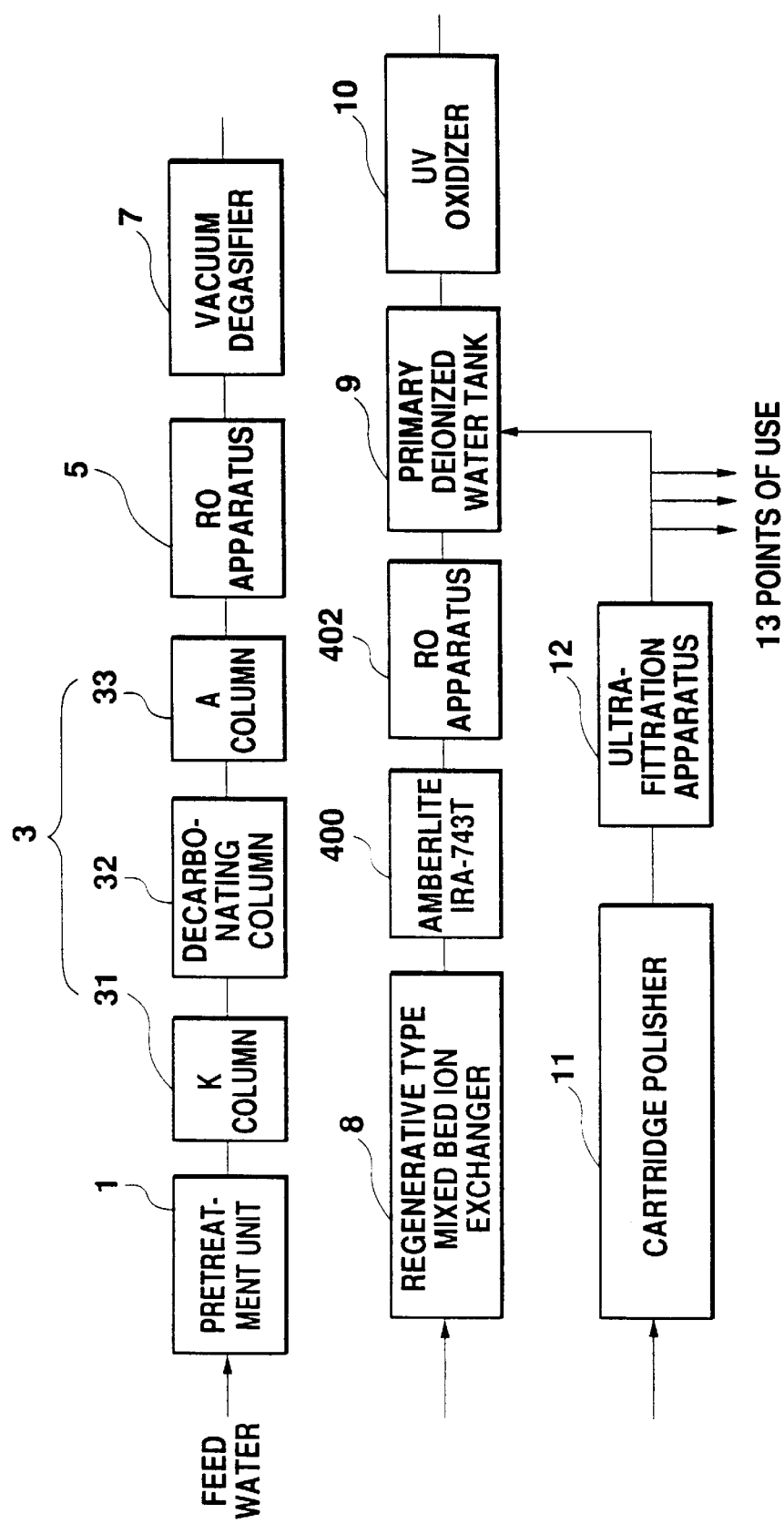
FIG. 8 is a block diagram showing the essential features of a high purity water producing apparatus according to Example 6 of this invention.

In the example of FIG. 8, an RO apparatus comprising a reverse osmosis membrane is interposed between the non-regenerative type ion exchange column 400 packed with AMBERLITE IRA-743T and the primary deionized water tank 9 of Example 5 shown in FIG. 6, the remaining features of the treatment scheme being identical to those of Example 5.

In this example, in addition to the advantages of Example 5, organic matter eluted from the boron selective ion exchange resin are removed by the RO membrane 402, so TOC in the secondary deionized water production system is reduced.

EXAMPLE 7

Figure 9:
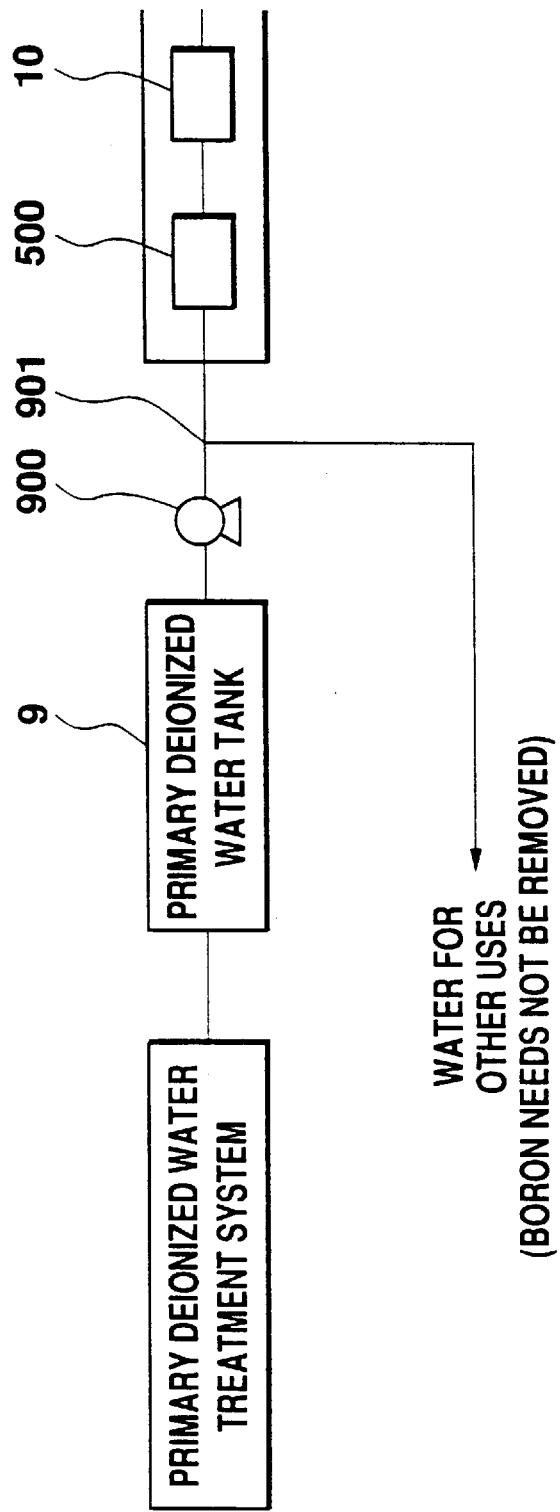
FIG. 9 is a block diagram showing the essential features of a high purity water manufacturing apparatus according to Example 7 of this invention.

This example, which is shown in FIG. 9, has the same basic treatment scheme as the conventional high purity water producing apparatus shown in FIG. 17 (where the K column 311 of FIG. 1 has been replaced by the K column 31 packed only with an ordinary cation exchange resin). A branch pipe 901 downstream of a pump 900 for supplying primary deionized water from the primary deionized water tank 9 to the secondary deionized water treatment system is provided, part of the primary deionized water thereby being supplied to the secondary deionized water system and the remaining primary deionized water being used for other purposes in which existence of boron does not pose any serious problem. A non-regenerative type ion exchange resin column 500 charged with the aforesaid Amberlite IRA-743T, which is a boron selective ion exchange resin, is provided downstream of this branch 901 at the stage preceding the ultraviolet oxidizer 10 of the secondary deionized water treatment system (upstream). An RO apparatus comprising a reverse osmosis membrane is installed at the stage following the ion exchange column 500 as in the case of the apparatus shown in Example 6

In the apparatus of this example, the same boron removal is achieved as in the case of the aforesaid Example 5, and due to the installation of the ion exchange column 500 downstream of the branch pipe for water for other uses, from which it is not necessary to remove boron, the ionic load on the ion exchange resin is decreased and the amount of resin used can be reduced. As the amount of water used for other purposes is frequently twice the amount of high purity water or more, the arrangement of this example presents a significant advantage.

EXAMPLE 8

Figure 10:
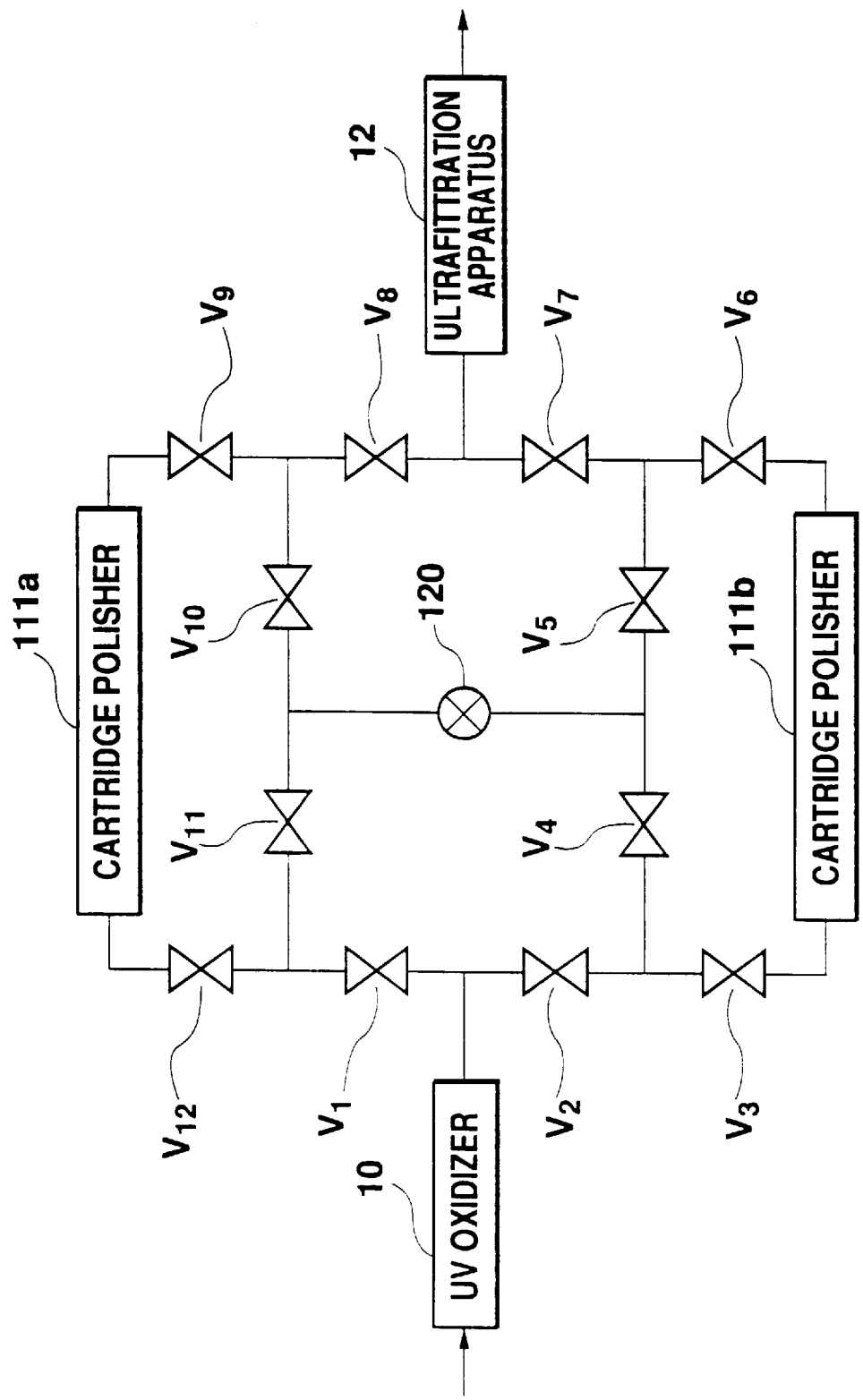
FIG. 10 is a block diagram showing the essential features of a cartridge polisher that performs merry-go-round operation, and that forms part of a high purity water producing apparatus according to Example 8 of this invention.

FIG. 10 shows the partial construction of a high purity water producing apparatus. In this example, instead of the cartridge polisher 11 of the high purity water producing apparatus in Example 17, a boron meter 120 and a pair of cartridge polishers 111a and 111b each packed with a boron selective ion exchange resin and connected in series are provided, and merry-go-round operation is performed by switching valves V1–V12.

In the cartridge polishers 111a and 111b, a boron selective ion exchange resin is charged as the upper layer on a mixed bed of a cation exchange resin and an anion exchange resin.

Figure 11:
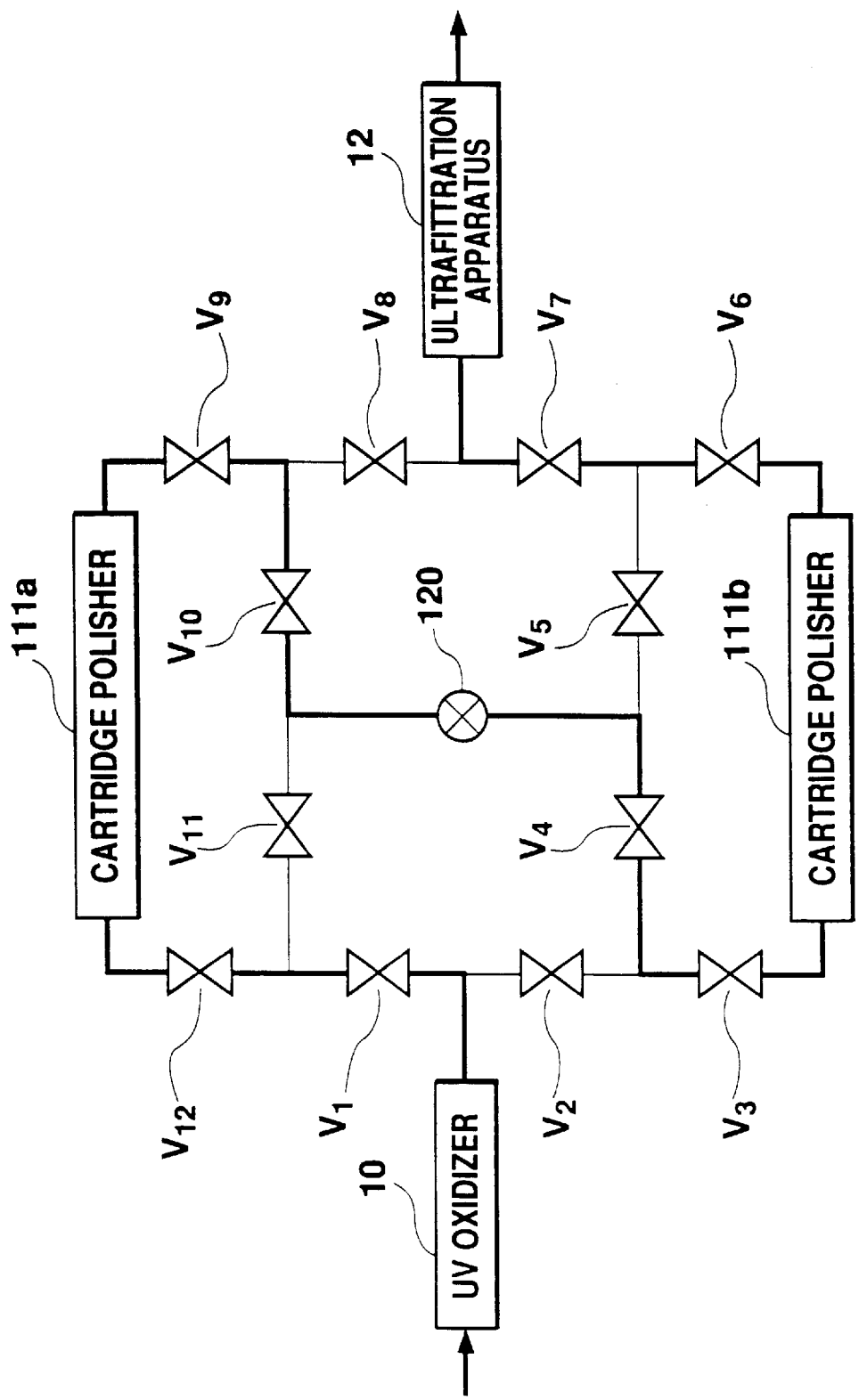
FIG. 11 is a block diagram for describing the merry-go-round operation of the cartridge polisher according to Example 8.
Figure 12:
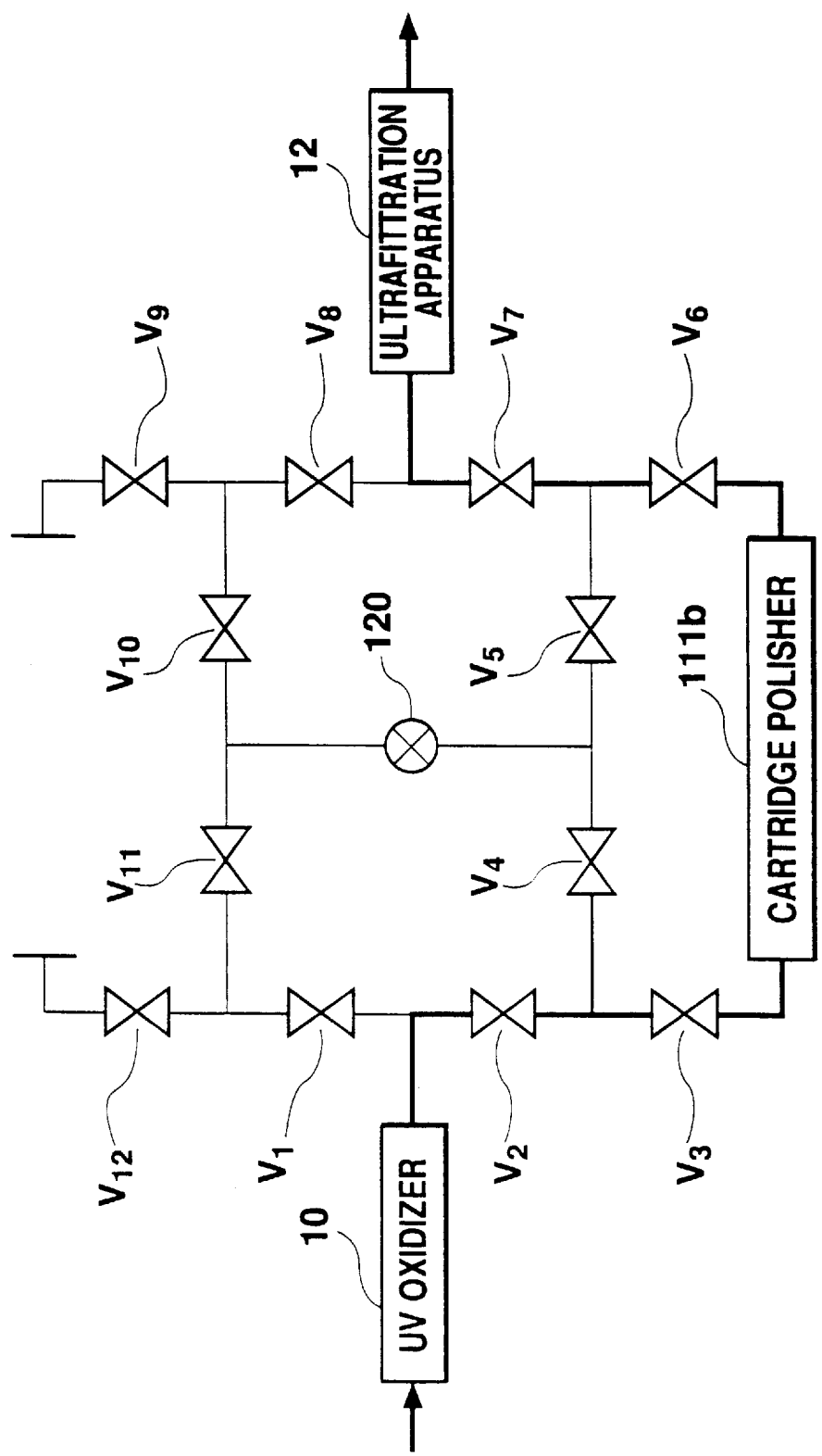
FIG. 12 is a block diagram for describing the merry-go-round operation of the cartridge polisher according to Example 8.
Figure 13:
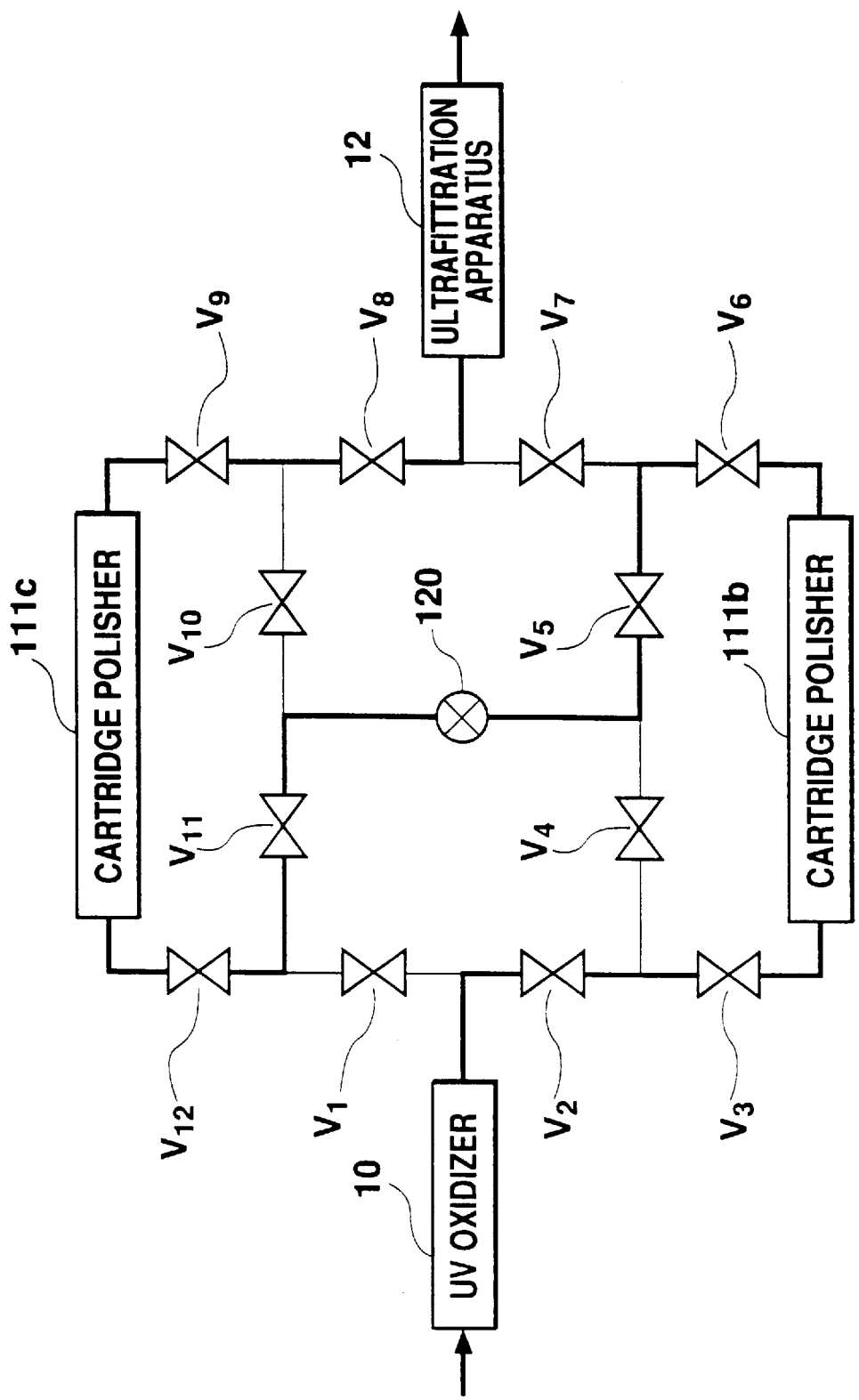
FIG. 13 is a block diagram for describing the merry-go-round operation of the cartridge polisher according to Example 8.

In this apparatus, the cartridge is replaced when the boron concentration in the effluent of the first cartridge polisher 111a has reached a predetermined concentration. Describing the merry-go-round operation with reference to FIG. 11–FIG. 13, in FIG. 11, the state of the valves is V1 open, V2 closed, V3 open, V4 open, V5 closed, V6 open, V7 open, V8 closed, V9 open, V10 open, V11 closed and V12 open. In this state, primary deionized water supplied from the primary deionized water tank 9 is passed through the ultraviolet oxidizer 10, cartridge polisher 111a, cartridge polisher 111b and the ultrafiltration membrane apparatus 12, as shown by the bold line in FIG. 11. The boron meter 120 is installed between the first cartridge polisher 111a and the second cartridge polisher 111b so that the quality of the treated water from the first polisher 111a can be constantly monitored. When the value measured by the boron meter 120 has reached a predetermined value, it is concluded that the lifetime of the polisher 111a has been reached. The valves are then changed over to the state V1 closed, V2 open, V3-open, V4 closed, V5 open, V6 open, V7 open, V8 closed, V9 closed, V10 closed, V11 closed and V12 closed, the spent cartridge polisher 111a is removed as shown in FIG. 12, and the primary deionized water supplied from the tank 9 is treated only by the polisher 111b as shown by the bold line in FIG. 12. After a new cartridge polisher 111c has been fitted to replace the polisher 111a which was removed as shown in FIG. 13, the valves are changed over and water begins to be passed through the system so that the polisher 111b is the first stage and the new polisher 111c is the second stage. The state of the valves shown in FIG. 13 is V1 closed, V2 open, V3 open, V4 closed, V5 open, V6 open, V7 closed, V8 open, V9 open, V10 closed, V11 open and V12 open. Primary deionized water then flows in the order of ultraviolet oxidizer 10—cartridge polisher 111b—cartridge polisher 111c—ultrafiltration membrane apparatus 12.

According to this method of operation, as boron does not accumulate in the second stage cartridge polisher 111c, leakage of boron can be permanently prevented.

In the cartridge polishers 111a, 111b, and 111c, the boron selective resin may be an upper layer over mixed resins, or it may be mixed with a cation exchange resin and anion exchange resin.

EXAMPLE 9

Figure 14:
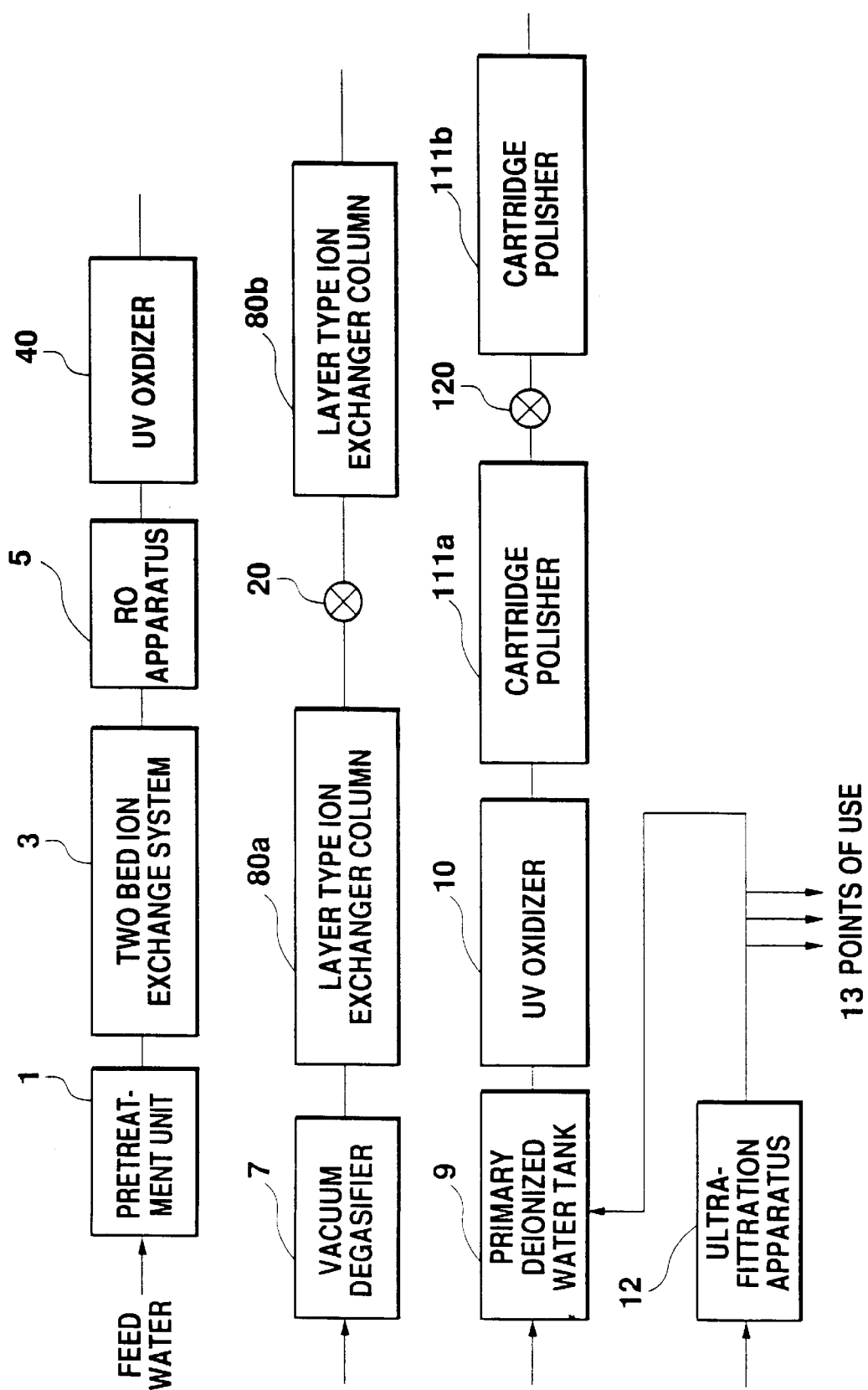
FIG. 14 is a block diagram showing the essential features of a high purity water producing apparatus according to Example 9 of this invention.
Figure 15:
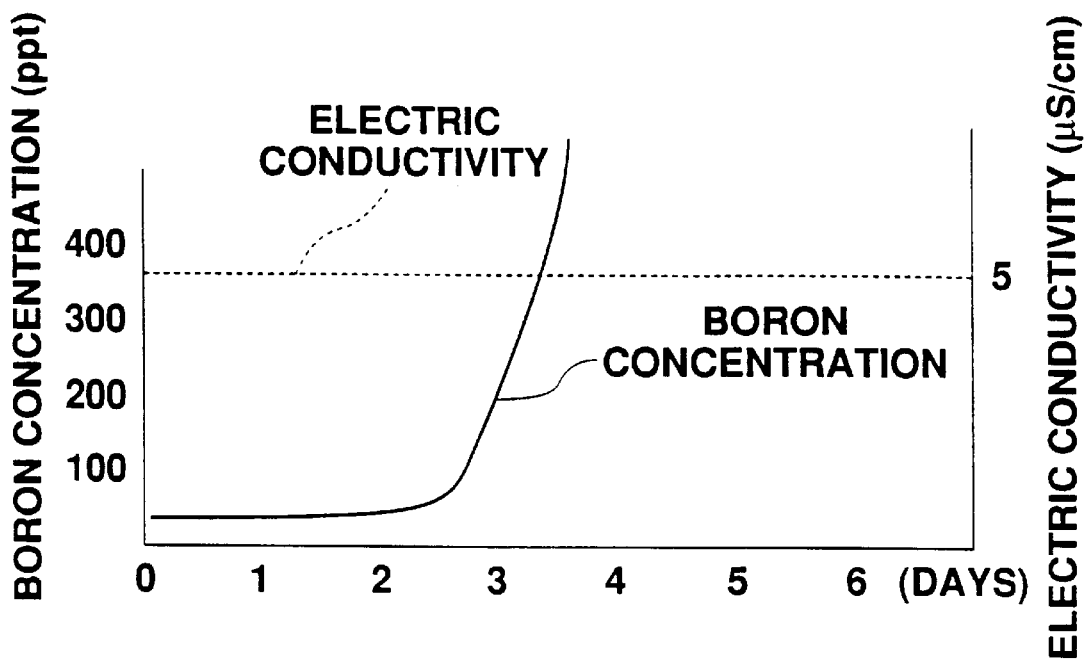
FIG. 15 is a diagram showing the variation with time of boron concentration in the effluent of a two bed ion exchange system in a conventional high purity water producing apparatus.
Figure 16:
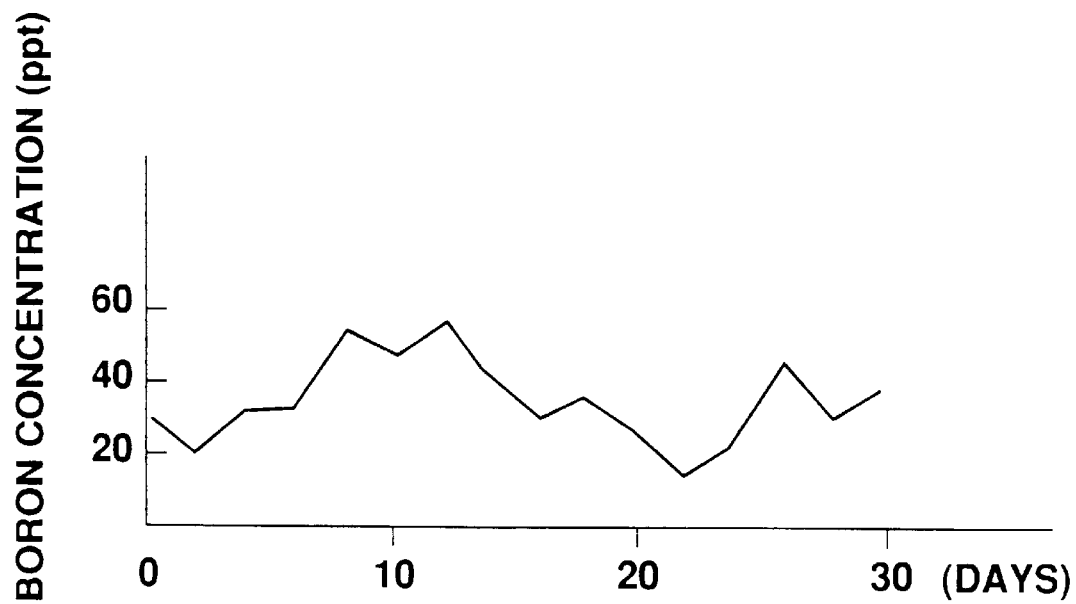
FIG. 16 is a diagram showing the variation with time of boron concentration measured at a usage point in a conventional high purity water producing apparatus.

FIG. 14 shows the case where an ultraviolet oxidizer 40 is situated between the RO apparatus 5 comprising a reverse osmosis membrane and the vacuum degasser 7 in the high purity water producing apparatus of FIG. 17, ion exchange columns 80a and 80b each containing layers of the boron selective resin and an anion exchange resin are installed in place of the regenerating mixed bed ion exchanger 8, and the treatment scheme includes a boron meter 20 in a so-called merry-go-round arrangement as shown in FIG. 14. In FIG. 14, dissolved TOC in the water treated by the RO apparatus 5 is decomposed into organic acids and carbon dioxide by the ultraviolet oxidizer 40, and then the dissolved oxygen and part of the dissolved carbon dioxide is removed by the vacuum degasser 7. Next, anions and boron which are present in minute amounts are removed by the layer type (stratified) ion exchange columns 80a and 80b. The columns 80a and 80b are regenerative type ion exchange columns, and after regenerating the first column using auxiliary regenerating means, water treatment begins in the arrangement where the first column is situated at a down stream side of the second column. The treated water from the columns 80a and 80b is sent to the primary deionized water tank 9. The treatment scheme after the ultraviolet oxidizer 10 is the same as that of Example 8, and the cartridge polishers 111a and 111b containing the boron selective resin are installed in a "merry-go-round" system, while a boron meter 120 is situated between the cartridge polishers 111a and 111b. High purity water is supplied to points of use 13 via the ultrafiltration apparatus 12.

What is claimed:

1. A deionized or high purity water producing method comprising: (a) pretreating feed water to remove suspended solids in the feed water, (b) contacting the pretreated water with (i) a first ion exchange resin and (ii) a second ion exchange resin comprising a boron selective ion exchange resin so as to remove boron contained in said pretreated water, and (c) stratifying or mixing together the first and second resins within an ion exchange column.

2. A deionized or high purity water producing apparatus comprising (a) a pretreatment unit comprising means for removing suspended solids in feed water, and (b) a purification treatment section comprising deionization means and membrane separation means for removing ionic and non-ionic substances contained in effluent of said pretreatment unit, wherein:

said deionized or high purity water producing apparatus includes an ion exchange column containing (i) a first ion exchange resin and (ii) a second ion exchange resin comprising a boron selective ion exchange resin, wherein said first and second resins are stratified or mixed together, and said column is provided in at least one location downstream from said pretreatment unit.

3. An apparatus as defined in claim 2, wherein:

said purification treatment section comprises a primary deionized water production system comprising membrane separation means for obtaining a primary deionized water from pretreated water produced by said pretreatment unit, a tank for storing the primary deionized water, and a secondary deionized water production system comprising at least one of ion exchange means, and membrane separation means for obtaining high purity water after said primary deionized water has passed through said tank, said ion exchange column being provided in at least one location in said primary deionized water production system, in said secondary deionized water production system, or between said primary deionized water production system and said secondary deionized water production system.

4. An apparatus as defined in claim 2 or claim 3 wherein:

said boron selective ion exchange resin contained within said ion exchange resin column is capable of being regenerated and further comprising means for regenerating the resin within the column, said regenerating means including means for passing at least one of the following regenerating agents: an acidic aqueous solution and an aqueous alkaline solution through said ion exchange resin.

5. An apparatus as defined in claim 4 wherein:

said ion exchange resin column is a single column containing a cation exchange resin in the form of a layer downstream of said boron selective ion exchange resin, and said regenerating means comprises means for passing an acidic aqueous solution as a regenerating agent through said column.

6. An apparatus as defined in claim 4 wherein:

said ion exchange resin column is a single column containing an anion exchange resin in the form of a layer upstream of said boron selective ion exchange resin, and said regenerating means comprises means for passing an alkaline aqueous solution as a regenerating agent through said column.

7. An apparatus as defined in claim 4 wherein:

said ion exchange resin column is an ion exchange column containing a mixture of said boron selective ion exchange resin, a cation exchange resin and an anion exchange resin.

8. An apparatus as defined in claim 3 wherein:

said boron selective ion exchange resin contained within said ion exchange resin column is not capable of being regenerated and said ion exchange resin column is provided downstream of said tank for storing primary deionized water; and a branch pipe is provided extending from a point downstream of said primary deionized water storage tank.

9. An apparatus as defined in claim 8, wherein at least one of an ultraviolet oxidizer and a reverse osmosis membrane apparatus are provided downstream of said ion exchange column containing said boron selective ion exchange resin.

* * * * *